United States Patent [19]
DeCrosta, Jr.

[11] Patent Number: 6,136,461
[45] Date of Patent: Oct. 24, 2000

[54] THERMOELECTRIC POWER CELLS

[76] Inventor: Edward Francis DeCrosta, Jr., 28 James St., Hudson, N.Y. 12534

[21] Appl. No.: 09/295,255

[22] Filed: Apr. 20, 1999

[51] Int. Cl.[7] .............................. H01M 6/36; H01M 4/36
[52] U.S. Cl. ............................. 429/11; 429/63; 429/106; 429/112
[58] Field of Search .................... 429/11, 14, 15, 429/24, 63, 80, 105, 106, 112; 136/236.1

[56] References Cited

U.S. PATENT DOCUMENTS

| | | |
|---|---|---|
| 3,031,520 | 4/1962 | Clampitt et al. . |
| 3,537,972 | 11/1970 | Decrosta . |
| 3,773,637 | 11/1973 | Decrosta . |
| 4,211,828 | 7/1980 | Peck . |
| 4,410,605 | 10/1983 | Peck .......................................... 429/11 |

*Primary Examiner*—Maria Nuzzolillo
*Assistant Examiner*—Tracy Dove
*Attorney, Agent, or Firm*—James Magee, Jr.

[57] ABSTRACT

Thermocells, also known as thermogalvanic electrochemical cells having one or more hot half-cells, electrolyte salt supplying reservoirs, porous inserts in the electrolyte conduits produce improved power output performance are disclosed.

7 Claims, 3 Drawing Sheets

THERMOELECTRIC POWER CELLS

This invention is directed to generation of electrical energy and more particularly to steady state thermogalvanic apparatuses and systems for direct conversion of thermal energy into electric current. The thermocell devices of this invention include apparatus and systems which operate primarily to generate electrical current in response to thermal gradients, systems and devices which use electrical current to remove heat from or introduce heat into a selected environment.

BACKGROUND

Thermocells in general are nonisothermal galvanic cells in which the electrodes are maintained at different temperatures and are in direct contact with an electrolyte which may be liquid or nonliquid solution. Temperature gradients and concentration gradients are present in conventional thermocells. The electrolyte contains ionic species for which the electrode reaction is reversible.

Such cells operate on a principle of mass flux against a temperature gradient that gives rise to a concentration gradient across each of the half-cells that comprise the basic cell unit. The concentration gradient generates as electromotive force and flow of electricity. Ions formed at the electrodes are transported between the half-cells to form an internal circuit. Oxidation occurs at the anode and electrons are given up and flow to the cathode through an external electrical circuit where positive ions recombine to form neutral materials.

SUMMARY OF THE INVENTION

A Thermocell, sometimes called a thermogalvanic electrochemical cell, includes a pair of half cells made of metallic electrodes in contact with an electrolyte comprising a suitable solvent and a solute that is a soluble salt of the electrode metal The thermoelectric cells of this invention are of the liquid electrolyte type which include at least one or more hot half-cells, at least one cold half-cell, an electrolyte solution containing conduit communicating with the hot half-cells and the cold half cells, a porous electrolyte permeable plug placed in the electrolyte conduit between the hot and cold half-cells, a reservoir of a metal salt in contact with the electrolyte solution of the hot half-cell or cells, and improved design of the hot half cell geometry. These modifications, particularly the porous plugs and the metal salt reservoir, separately and collectively enhance the power generating capability of the total cell and system.

The thermocells of this invention include metallic electrodes in contact with an electrolyte that contains ions of the electrode metal. The electrodes are maintained at different temperatures and are connected by an external conductor. The temperature gradient between the electrodes within the circuit causes a potential difference within the circuit. Under such conditions a current of electrons flows from the higher temperature electrode to the lower temperature electrode. The internal circuit formed by the device comprises the metallic ions and their associated anions. The electrodes can be in the form of metal wire, ribbon, metal tubes or any suitable structure or form. One particularly useful form of electrode is pipe or tube shaped sections through which the electrolyte solution can communicate with the electrolyte conduits, thus completing the internal circuit of the thermal cell.

The improved performance of the thermocells of this invention is achieved by controlling the cross sectional area of the internal circuit, by providing reservoirs of solid metallic salt in contact with the electrolyte thereby maintaining substantial saturation of the cell electrolyte, and by providing increased electrode surface area for reaction in the hot cell.

In a basic thermocell there is a transfer of metal from the hot half-cell (anodic) to the cold half-cell (cathode). This tends to reduce the useful life of the electrodes. Providing a reservoir of salt allows the cell to operate in a steady state at essentially saturated conditions under which dissolution of the anode and deposition on the cathode is substantially reduced.

Placing one or more porous bodies in the electrolyte conduit connecting the hot and cold half-cells reduces heat transfer from the hot half-cell to the cool half-cell by convection and conduction. This maintains a desired temperature gradient and enhances the production of the electrons at the anode and the potential difference between the half-cells. The porous media also helps to stabilize the concentration of the electrolyte in the vicinity of the electrodes by reducing diffusion of ions in the electrolyte.

The thermal gradient across the half-cells is established by supplying heat to the electrode selected as the hot half-cell. Heat can be applied by any conventional means suitable to efficient heat transfer. For example the hot cell can be provided with a heating jacket or placed in a heated and insulated chamber or vessel. The heat source can be radiant energy, an external heat exchanger, or any other transfer method. The precise nature or construction of the heating means is important only as such means impact the design, structure, and location of the thermocell and related systems.

A purpose of this invention is to generate useful electric power using thermal energy such as waste heat from manufacturing operations, waste hydrocarbon gas from petroleum or natural gas production, geothermal sources. Waste or unwanted heat from any source can be used to activate thermoelectric cells.

The power generating process of this invention can be carried out in a continuous or an intermittent mode.

The invention provides a method or process for direct generation of electrical energy from thermal energy by constructing a thermogalvanic cell comprising at least two metal electrodes containing half-cells, preparing a substantially saturated electrolyte solution of a soluble salt of the metal of which the electrodes are made, contacting the electrodes with the electrolyte solution by means of a an electrolyte conduit which communicates with each electrode thereby forming a salt bridge as the internal circuit of the thermogalvanic cell, setting the temperature of least one half-cell to a temperature higher than the temperature of at least one other half-cell, thereby forming a temperature gradient between the high temperature and low temperature electrodes, reducing the heat transfer by convection or conduction between the high temperature and low temperature electrodes by placing porous material in the electrolyte conduit between electrodes having a temperature gradient, and maintaining the saturation of the electrolyte by contacting the electrolyte solution with source of metal salt contained in a reservoir communicating with the electrolyte solution the electrolyte conduit.

The thermal gradient can be established by application of heat or thermal energy to one electrode or half-cell or by removal of heat, as by a heat sink, from another electrode or half-cell.

DESCRIPTION OF THE INVENTION

Figure 1:
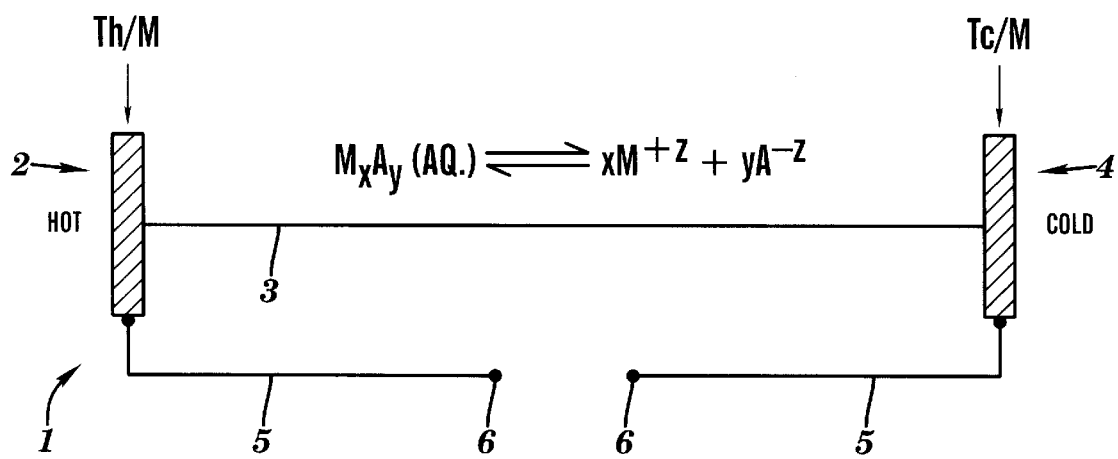
FIG. 1 is a schematic representation of a simple liquid electrolyte thermocell.

A simple thermocell such a illustrated in FIG. 1, generally comprises two identical half-cells in contact with an electrolyte solution of a salt of the metal of which the electrodes are constructed. One half-cell, called the hot half-cell can be enclosed in a chamber at a selected temperature that is higher than the temperature of the cold half-cell. The cold cell is generally at ambient temperature but can be in a cooling chamber or other enclosure at any convenient temperature below the temperature of the hot cell.

The electrolyte is in contact with both electrodes and completes the internal circuit of the whole thermocell. The electrolyte solution should contain ionic species for which the electrodes are reversible, for example, copper ions for copper electrodes or silver ions for a silver electrode.

The metal salts selected, as the electrolyte solute can be any soluble salt that is stable in aqueous solution. However, it is preferred that the salts be nontoxic, readily available at reasonable cost, and environmentally safe. In selecting metal salts for use in the electrolyte solution consideration should be given to various aspects of the salts such as solubility, degree of ionization, coordination number, ionic mobility, and the like. Preferred salts, subject to choice of electrode metal include cupric chloride, cupric sulfate, aluminum chloride, aluminum sulfate, and the chloride or sulfate salts of lithium.

The voltage or emf generated by a thermocell is dependent on a variety of factors such as the composition of the electrode, the solubility and activity of the salt, and the temperature gradient between the half-cells. For any selected electrolyte salt the emf is primarily a function of the initial concentration in the electrolyte solution and the temperature gradient.

The temperature gradient can be from about 50 to 70 degrees F. above ambient or room temperature. Insulated hot chambers and heat sinks can be used to control temperatures.

Performance of a thermocell is measured by the power generated. Power is generally expressed in watts according to the formula W=vi where v is the voltage and I is the current in amperes. When I=v/r where r is the internal resistance of the cell. The power of the cell is therefore $W = v^2/r$.

In operation of a thermocell ions diffuse through the electrolyte internal circuit in a direction which is opposite to the temperature gradient forming a higher ionic concentration in the hot half-cell. The result is formation of a concentration cell in which the electrodes are at different temperatures. The equilibrium constant of the hot cell is higher than the constant for the cold half-cell. This condition causes release of more electrons at the hot electrode which produces an emf that is a combination of the temperature and concentration gradients.

Since the power of the whole cell depends on the difference in the number of electrons released at each electrode, it is desirable to increase electron release at the hot electrode relative to the cold electrode. Electrode reactions at each electrode are heterogeneous and depend on the surface area available for reaction. Surface area can be increased by forming the electrodes as particles, spheres, tubes, wire, woven or pressed mesh, and the like.

The invention should be considered with reference to the accompanying drawings.

FIG. 1 shows a basic thermocell 1 in schematic plan view. The cell includes hot half-cell 2, cold half-cell 4, electrolyte conduit 3 and an external circuit with conductors 5 and data junction 6 for insertion of a volt-ohmmeter for measuring emf and internal resistance. Electrodes of the half-cells are constructed of metal M are maintained at selected temperatures by any convenient means. Electrolyte conduit and the electrolyte solution complete the internal circuit. The electrolyte that is in contact with both electrodes can be an aqueous solution of soluble metal salt of metal M.

Figure 2:
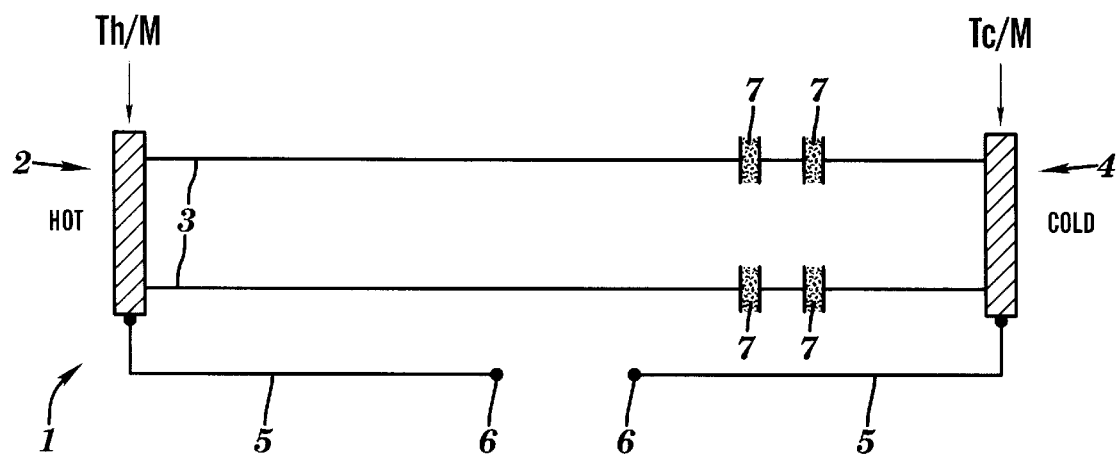
FIG. 2 is a schematic representation of thermocell having a pair of electrolyte conduits communicating between the hot and cold half-cells modified in accordance with this invention by inclusion of a porous material plug or insert in the electrolyte conduits.
Figure 3:
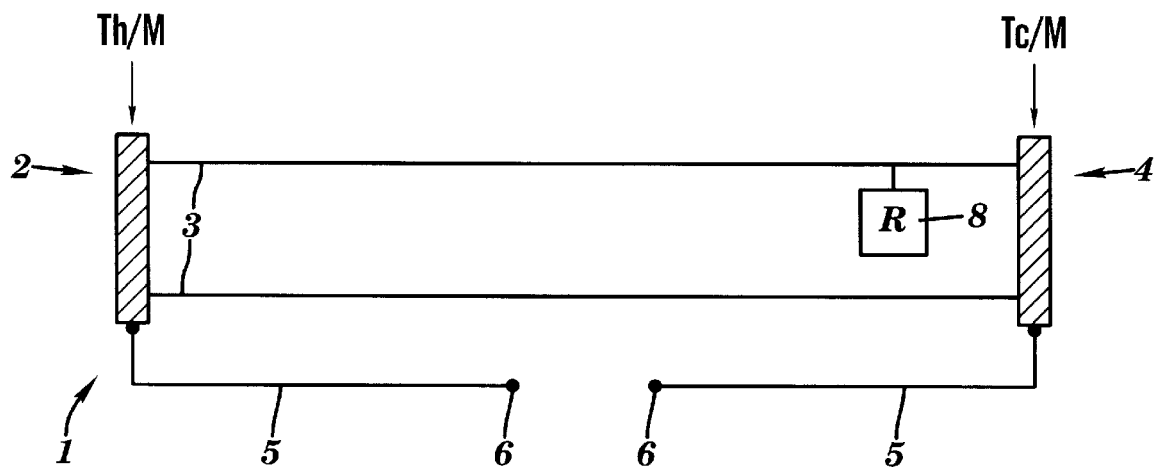
FIG. 3 is a schematic representation of thermocell having a pair of electrolyte conduits communicating between the hot and cold half-cells and a salt reservoir in the internal circuit of the thermocell.
Figure 4:
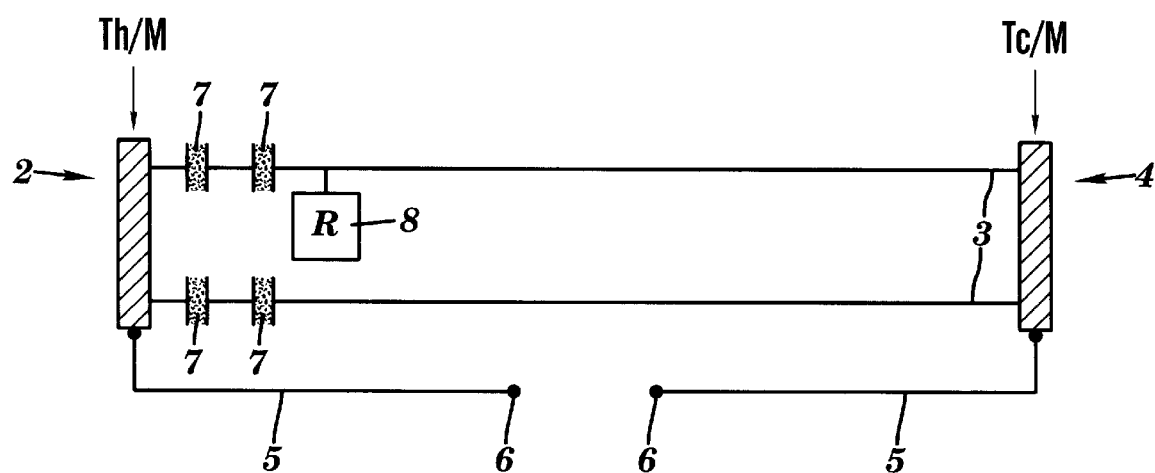
FIG. 4 is a representation of an embodiment that combines porous inserts and a salt reservoir in an "O" type thermocell.

Various aspects of the improved thermocell of the invention are illustrated in FIGS. 2 through 4.

FIG. 2 illustrates one embodiment of the invention that can be described as an "O" cell comprising hot half-cell and electrode 2 of metal M, cold half-cell of metal M, and a pair of electrolyte conduits 3 that provide the circular internal circuit for which the cell is designated. The electrolyte in the cell is a solution of a soluble salt of metal M. Electrical conductors or lead wires 5 contact the electrodes of each half-cell and pass to junction 6 for data gathering. Plugs or inserts of a porous material 7 are located in each of the conduits 3. These inserts serve to reduce flow of heat from the hot side to the cold side by conduction and convection, thereby stabilizing the temperature gradient. The inserts also may reduce diffusion of ions thus maintaining the concentration variation.

The porous material should be permeable to the electrolyte solution and the ionic species used in the thermocell. Preferably the porosity should provide a void volume of about 50 to about 85 percent based on the total volume of material measured under standard conditions.

The material used to form the porous plug can be any material which is stable in the chemical and physical environment of the operational thermocell. Illustrative materials include nylon, polyester, polyethylene, and polypropylene. The materials can be used in the form of yarns processed into woven or nonwoven structures. Suitable plugs can be provided as porous or fenestrated containers or canisters filled with properly sized solids of various geometric shapes depending on the porosity desired for operation of the thermocell.

FIG. 3 describes another feature of the invention that can be used independently or in combination with the porous inserts shown above. Metal salt reservoir 8 is connected to and communicates with electrolyte conduit 3. The reservoir contains a supply of the metal salt, which continues to dissolve in the liquid electrolyte thus maintaining the electrolyte solution in a substantially saturated state. In embodiments where the hot half-cell is placed in an insulated chamber the reservoir can be located in the chamber, if convenient.

FIG. 4 shows an embodiment of the invention that combines the porous plug insert and the metal salt reservoir features of the invention in a single thermocell. The porous plugs are seen as being located in an optimum position between hot half-cell and the reservoir. Other locations may be more suitable depending on thermocell design and construction.

Figure 5:
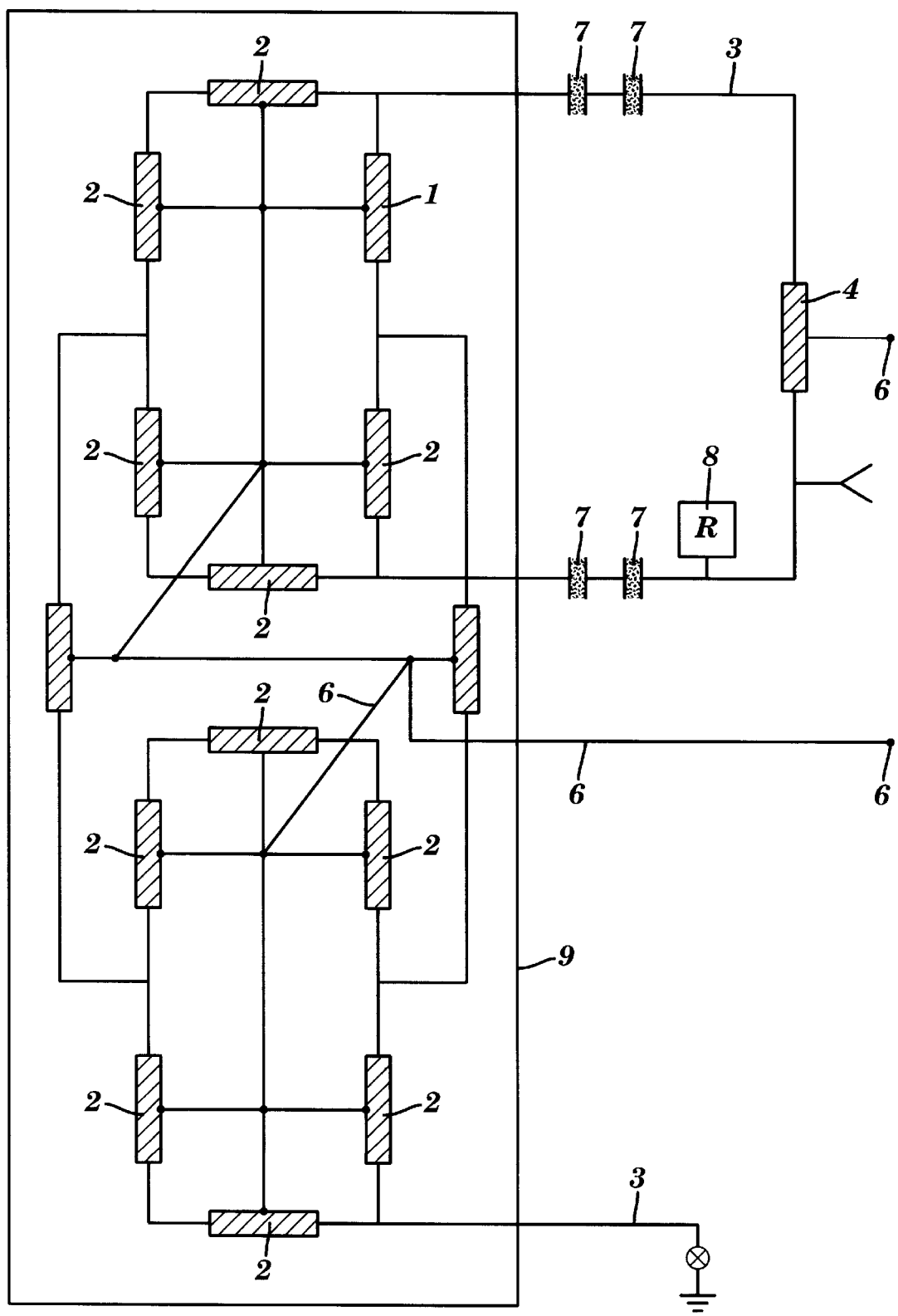
FIG. 5 is a schematic representation of a thermocell having multiple hot half-cells placed in a thermally insulated chamber and a single cold half-cell at ambient temperature.

FIG. 5 shows another embodiment of the invention in which there are multiple hot half-cells in conjunction with porous inserts in the electrolyte conduit and a salt reservoir. The hot cells are enclosed in an insulated chamber 9. Each of the hot cells is in direct electrical contact with the cold half-cell via the internal circuit The following table gives results of test runs on the basic cell of FIG. 1 and comprises the results to comparable test runs on modified cells within the scope of the invention. More specifically the basic cell designated as S is compared with a cell having porous plugs designated as S+PP, a cell having a salt reservoir designated as S+R, a cell having both porous plugs and a reservoir designated as S+PP+R, and a thermocell having multiple hot half-cells and a single cold half-cell designated as Mu;Mono C.

TABLE 1

| Experiment No. | UW  | Cell Designation | Ratio |
|----------------|-----|------------------|-------|
| 8              | 1.0 | S                | 1.0   |
| 13             | 6.0 | S + PP           | 6.0   |
| 15             | 3.0 | S + R            | 6.0   |
| 20             | 3.8 | S + PP + R       | 3.8   |
| 21             | 4.0 | MuH:mono C       | 4.0   |

The term Ratio as used above means the ratio of the power output of the thermocell described to the power output of the basic cell (S) of Experiment 8. In the case of the basic cell the ratio is unity.

The above test results show that the modified thermocells of this invention produce significantly improved power output as compared to the basic cell (S).

The thermocell used to produce the above data was in the form of a closed loop containing 6 inch electrodes cut from rigid copper tubing having an outside diameter of 0.75 inches and a wall thickness of 0.6875 inches. The electrodes are joined by plastic tubing and fittings sized to accommodate the electrodes. The plastic tubing forms the electrolyte conduit of the internal circuit in which electric charges are transferred by the ionic species resulting from the dissolution of the metal salt. The metal salt used in these tests was copper sulfate. When heat is applied to one of the electrodes an electrical potential is developed.

In the test device bronze grounding clamps were attached to the outside of each electrode and lead wires are used to attach a digital volt-ohm meter for electrical measurements.

The power of the cell was determined by measuring the internal resistance and the open circuit voltage of the cell at the prevailing temperature. The current produced is calculated using the formula I (amperes)=emf (volts)/resistance (ohms). The cell power was determined according to the formula W (watts)=(volts)×(amperes). The ratio (R) of the power of the modified cells to that produced by the unmodified cell is used as a measure of the efficiency of the modifications. The external measurement circuit is closed between measurements.

What is claimed is:

1. A steady state thermoelectric cell comprising at least one hot half-cell and a cold half-cell, metal electrodes for each half-cell in contact with a substantially saturated metal salt aqueous electrolyte, said metal salt being a salt of the electrode metal, at least one electrolyte conduit between each hot half-cell and cold half-cells forming the internal circuit of the thermoelectric cell, an electrolyte permeable material plug positioned in said conduits, and a reservoir containing solid metal salt corresponding to the metal salt of the electrolyte in liquid contact with the substantially saturated liquid electrolyte.

2. The steady state thermoelectric cell of claim 1 wherein the reservoir of solid metal salt is positioned on the hot half-cell side of the electrolyte permeable plug, said plug being electrolyte stable and made of nylon, polyester, polyethylene, or polypropylene processed into a woven or nonwoven structure.

3. The steady state thermoelectric cell of claim 1 wherein the electrode metal is copper, aluminum, or lithium in the form of pipe, tube, particles, spheres, wire, woven mesh, or pressed mesh.

4. The steady state thermoelectric cell of claim 2 wherein the electrolyte permeable material plug has a void volume of from about 50 to about 85 percent based on the total volume of said material.

5. A steady state thermoelectric system comprising a plurality of hot half-cells, a single cold half-cell, one or more electrolyte conduits connecting the chambers of the hot and cold half-cells, a substantially saturated aqueous solution of a metal salt corresponding to the electrode metal of the half-cells filling the chambers and conduits thereby forming the electrolyte bridge of the internal circuit of the thermoelectric system.

6. A method for constructing a thermoelectric cell according to claim 1 comprising at least one hot half-cell chamber, a cold half-cell chamber, at least one electrolyte conduit connecting the chambers of the hot and cold half-cells, a substantially saturated aqueous solution of a metal salt filling the chambers and conduits thereby forming the internal circuit of the thermoelectric cell, an aqueous solution of a metal salt filling the chambers and conduits thereby forming the internal circuit of the thermoelectric cell, and a reservoir containing solid metal salt in contact with the electrolyte in liquid communication with the electrolyte bridges of the internal circuit.

7. A method for constructing a thermoelectric cell comprising a plurality of hot half-cell chambers, a single cold half-cell chamber, at least one electrolyte conduit connecting the chambers of the hot and cold half-cells, a substantially saturated aqueous solution of a metal salt filling the chambers and conduits thereby forming the internal circuit of the thermoelectric cell, a porous material plug in the electrolyte conduit between chambers having a temperature gradient, and a reservoir containing solid metal salt in contact with the electrolyte in liquid communication with the electrolyte bridges of the internal circuit positioned near the hot half-cell chambers.

* * * * *